UNITED STATES PATENT OFFICE.

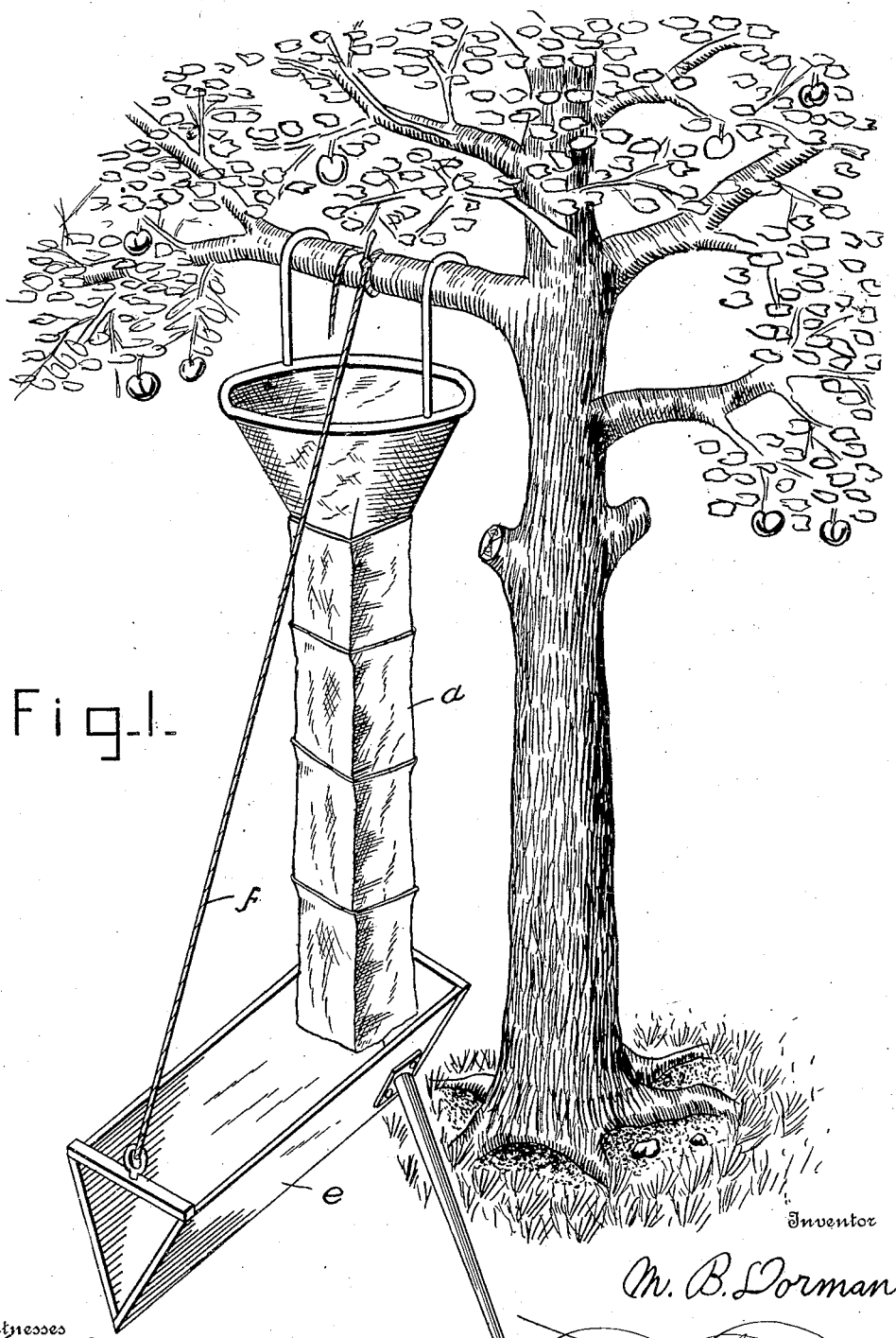

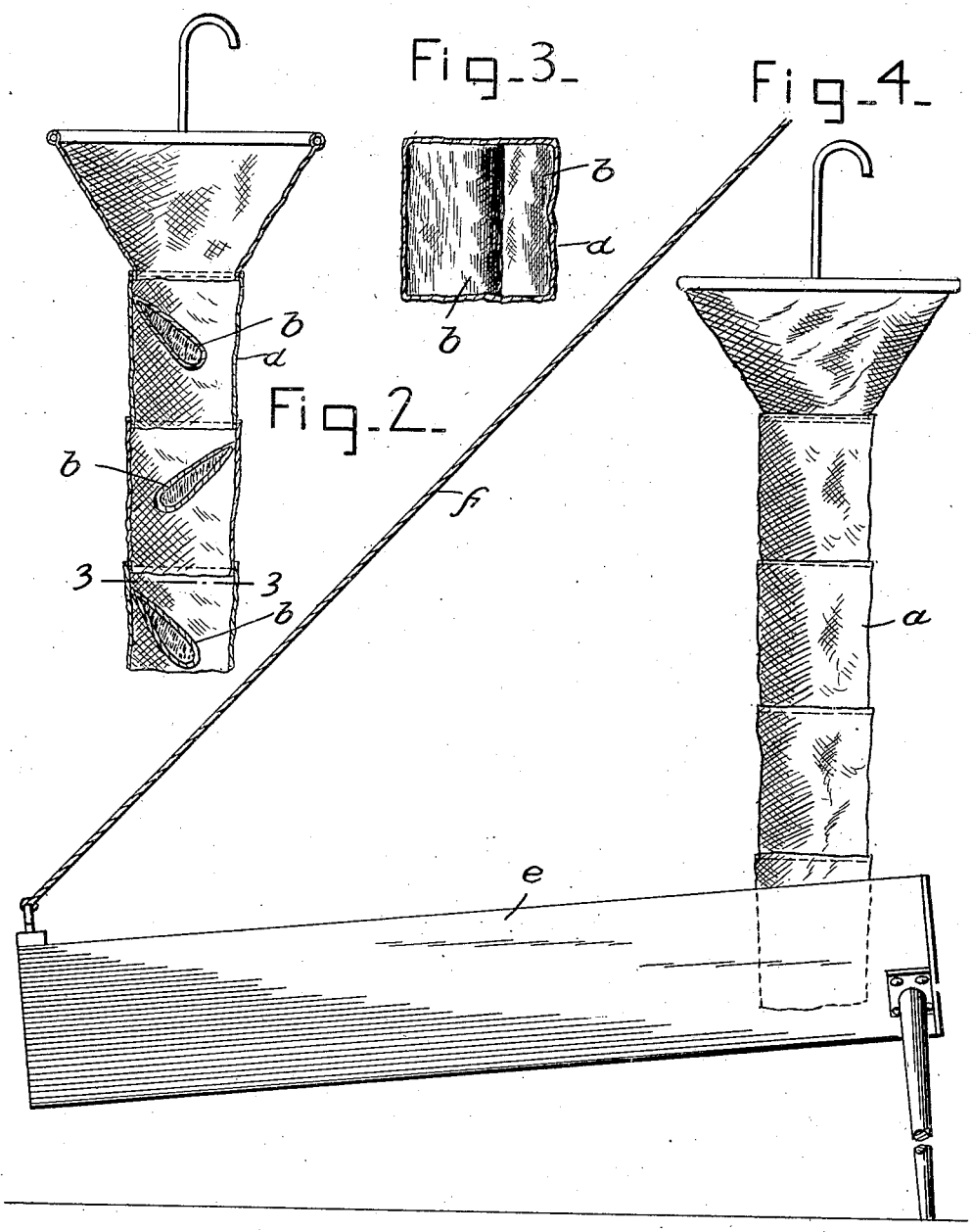

MILTON B. DORMAN, OF MILL HALL, PENNSYLVANIA.

FRUIT-CONVEYER.

No. 876,529.　　　Specification of Letters Patent.　　　Patented Jan. 14, 1908.

Application filed March 4, 1907. Serial No. 360,427.

*To all whom it may concern:*

Be it known that I, MILTON B. DORMAN, a citizen of the United States, residing at Mill Hall, in the county of Clinton, State of Pennsylvania, have invented certain new and useful Improvements in Fruit-Conveyers; and I do hereby declare the following to be a full, clear, and exact description of the invention, such as will enable others skilled in the art to which it appertains to make and use the same.

This invention has relation to fruit gatherers of the class in which the fruit picked from the trees may be conveyed to the ground without damage.

It is the purpose of the invention to provide improved means of the kind mentioned that will facilitate the gathering of fruit and that may be of simple construction as well as efficient in use, being easily operated by one person.

The nature of the invention may be fully ascertained from the contrivance portrayed in the annexed drawings, forming a part of this specification, in view of which it will first be described in detail with respect to its construction and mode of use, and then be particularly pointed out in the subjoined claims.

Of the said drawings—Figure 1 is a perspective view showing the complete contrivance in use at and on a fruit tree. Fig. 2 is a sectional view of the chute. Fig. 3 is a section in the plane 3 3, Fig. 2. Fig. 4 is a side elevation showing the manner of manipulating the trough.

Similar letters of reference designate similar parts.

In carrying out the aim of my invention, I construct a chute made of a series of short sections of some fabric. When assembled and finished each chute section as shown in Figs. 1 and 3 is square in cross section to form a four-sided conveyer.

Within each chute section there is a square deflector made in folding a square piece of cloth preferably canvas and stitching the opposite edges to form a pocket. This is then stuffed with straw or other suitable material when the remaining edge is sewed to form a cushion. One cushion is then secured within each chute section by means of suitable stitching. These cushions form deflectors and are secured by means of their border portions which extend beyond the stitching in such a manner that the rounded unstitched edge of each cushion extends into the chute as shown in Fig. 2, the deflectors being alternately positioned oppositely and inclined alternately in opposite directions. The stuffing imparts a certain degree of stiffness lengthwise to each deflector so that the chute retains its square shape or outline after these deflectors have been secured within the chute sections.

In using this fruit conveyer when the same is suspended a trough *e* is placed under the lower end of the same so that as the fruit travels through the chute successively dropping upon the deflectors it will finally pass into and

Having thus described my said invention what I claim as new is

The described fruit conveyer comprising a series of short fabric chute sections, and a square deflector within each chute section, said deflectors being successively oppositely positioned and alternately inclined in opposite directions each deflector being stuffed to retain its outline for the purpose set forth.

In testimony whereof, I affix my signature, in presence of two witnesses.

MILTON B. DORMAN.

Witnesses:
　ELIZABETH A. HARTER,
　ALICE C. DORMAN.